United States Patent

[11] 3,588,376

[72] Inventors Carl-Heinz Jeske
Munich, Germany;
William E. Johnston, Los Angeles, Calif.

[21] Appl. No. 663,111
[22] Filed Aug. 24, 1967
[45] Patented June 28, 1971
[73] Assignee Sub-Atlas-Werke GmbH,
Munich, Germany

[54] DICTATING MACHINE WITH MEANS TO PREVENT RECORDING ON PREVIOUSLY RECORDED TAPE
7 Claims, 2 Drawing Figs.

[52] U.S. Cl. .......... 179/100.2, 179/100.1
[51] Int. Cl. .......... G11b 15/04
[50] Field of Search .......... 179/100.1 (VC), 100.1 (DR), 100.2 (S)

[56] References Cited

UNITED STATES PATENTS

| | | | |
|---|---|---|---|
| 2,606,253 | 8/1952 | Somers | 179/100.1 |
| 2,675,430 | 4/1954 | Clarke | 179/100.2 |
| 2,833,866 | 5/1958 | Esser | 179/100.2 |
| 3,288,941 | 11/1966 | Langendorf et al. | 179/100.1 |
| 3,426,161 | 2/1969 | Dollenmayer | 179/100.1 |

OTHER REFERENCES

Huckabee, J. M. and N. J. Albanes. " Dictating System With Privacy Feature and Guard Zone," IBM Technical Disclosure Bulletin, Vol. 5, No. 12, May, 1963.

*Primary Examiner*—J. Russell Goudeau
*Attorney*—Wolf, Greenfield and Sacks

ABSTRACT: A dictating machine adapted to receive a magnetic recording medium carrier and having a transducer and means associated with the transducer for recording and playing back from the recording medium, respectively. The dictating machine also includes means for limiting the machine to its playback mode of operation for a fixed time interval at the beginning of the recording tape to determine whether or not information is recorded thereon.

Figure 1:
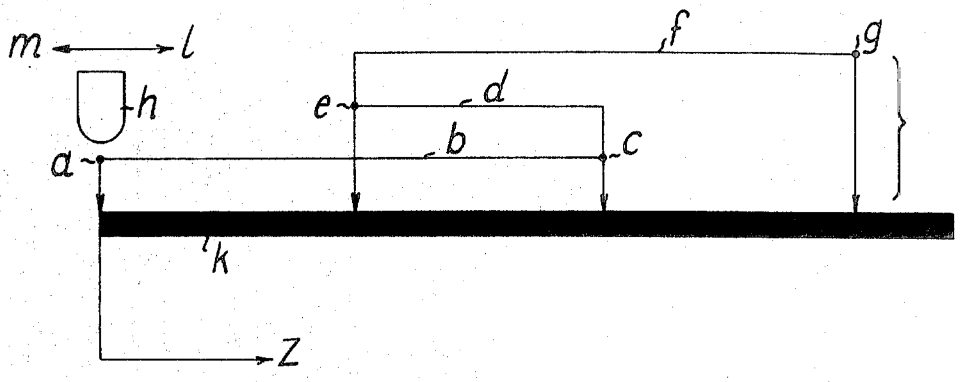

INVENTORS
CARL HEINZ JESKE
WILLIAM E. JOHNSTON
by Wolf, Greenfield & Hieken

DICTATING MACHINE WITH MEANS TO PREVENT RECORDING ON PREVIOUSLY RECORDED TAPE

The invention relates to dictating machines using exchangeable magnetic recording carriers.

In such dictating machines, the disadvantage exists that already dictated magnetic recording carrier cannot be recognized as such, so that it can easily happen that already dictated carrier material is introduced again into the dictating machine and recorded on, so that the first dictation is lost. This disadvantage is particularly serious if the machines are arranged in a central pool, as the dictating person cannot himself notice the erroneous overrecording. However, also in the case of individual machines it is annoying to the user if after introducing a fresh sound carrier it is only noticed after a number of minutes' speaking time, that the recording carrier has already been recorded.

It is an object of the invention to provide a dictating machine, using exchangeable magnetic recording carrier, in which an accidental dictation of an already dictated recording carrier is prevented.

This object can be achieved in accordance with the invention by providing the dictating machine with an arrangement which after the machine is put into operation for the purpose of recording fresh dictation, or after introducing a fresh magnetic carrier into the machine, necessarily puts the machine into the playback position for a predetermined test interval of e.g. 10 seconds. It is thereby achieved that each freshly inserted magnetic carrier is firstly tested as to whether it has already been transcribed and erased or is still in the recorded condition, and thereby an unintentional overrecording or erasing of a recorded sound carrier is avoided.

Preferably, a signal taken from the magnetic recording carrier, and above a predetermined threshold level, can maintain the compulsory playback positioning even beyond the predetermined test interval, and prevent changeover for dictation recording, as long as this signal exceeds the predetermined amplitude threshold. By this means, the overrecording of sound carriers which already contain recordings is prevented. Recording of dictation onto an already recorded magnetic recording carrier can be reliably prevented also in such a way that the arrangement allows dictation recording only if after introducing an already dictated magnetic recording carrier, another magnetic recording carrier without an above-threshold signal in the test interval is introduced into the machine.

With dictation installations in which the dictation machines are provided in a central location or pool and can be called into service by various people, it is desirable that the listening to already recorded magnetic recording carriers mistakenly inserted is prevented. For this purpose, blocking means may be provided which during the predetermined test interval and during the test interval extended by an above-threshold signal, the listening to the recording is prevented.

Control in a predetermined test interval requires that the possible dictation already on the magnetic recording carrier actually occurs during the predetermined time interval. This requirement is however not always satisfied and it can occur that the recorded dictation only begins after expiry of the test period. In order to exert the desired control independently from the actual dictation region, it can be arranged that within the test interval a compulsory recording takes place in which if the above-threshold signal is missing in the test interval firstly a compulsory backward movement and then an above-threshold test tone recording within the test tone interval is performed, and only subsequently is the machine switched over for dictation recording.

Figure 2:
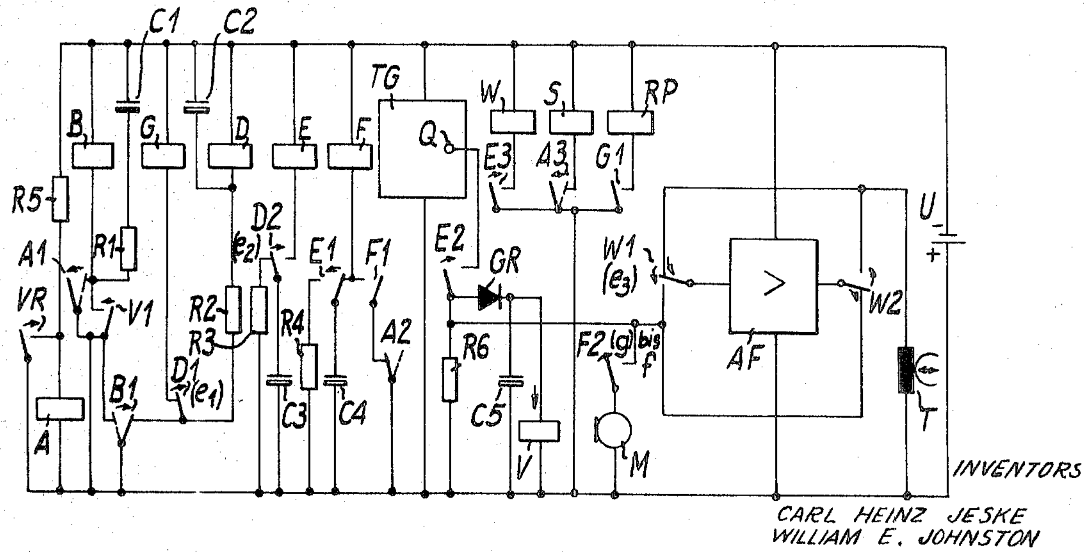

In order to make the invention clearly understood reference will now be made to the accompanying drawings which are given by way of example and in which:

FIG. 1 diagrammatically illustrates a magnetic recording carrier with a test interval and a test tone recording; and FIG. 2 is a circuit diagram of a dictating machine according to the invention.

For understanding the circuit illustrated in FIG. 2 of an embodiment of a machine according to the invention it is advantageous firstly to describe with reference to FIG. 1, the procedures which take place before recording a newly inserted magnetic recording carrier, after the machine is placed into operation.

After a new magnetic recording carrier is introduced into the machine, at the beginning of the operation of the machine the magnetic head T is at the commencement point *a* of the recording track *k*.

The recording carrier transport is released as soon as a new recording carrier is correctly introduced and the machine is switched on. The magnetic head T then runs on the recording track *k* in the direction *l* during a first time interval *b* of e.g. 10 seconds, up to the point *c*.

If in the time interval of the commencement region *b* of the recording track, a magnetic recording is present on the recording carrier, then the head runs beyond the extent *b* and the machine is neither released for listening nor for recording until a fresh, not-recorded recording carrier is introduced. If during the time interval *b* no magnetic recording is detected on the recording carrier, then following the test interval *b* a backward running interval over a track amount *d* corresponding to a normal running time of e.g. 5 seconds takes place. The backward running amount *d* in the movement direction *m* may be accomplished as a jump or smoothly from point *c* to point *e*.

When the head T arrives at point *e*, the movement direction of the head T relative to the recording track is again reversed. The head runs again in the direction *l* over an extent or an interval *f* of e.g. 10 seconds. This interval *f* is designated in the following as a test tone interval. In the test tone interval, the head T has applied thereto a low frequency voltage so that from the point *e* to the point *g* on the recording track k a corresponding test tone is recorded. After expiry of the test tone interval *f*, the dictating machine is switched over at the point *g* in readiness for recording.

In FIG. 2, a circuit of an embodiment of a dictating machine having the above-illustrated functions is shown. The machine is provided with a latching lever for the opening (not shown) in which the magnetic recording carrier is placed. With the latching lever, a mechanism for lifting the record/playback head from the recording carrier, and a contact VT are connected, this contact being closed when the latching lever is closed, and opened when the latching lever is opened. In FIG. 2, only the contact VR of this latching arrangement is illustrated. The contact VR lies in a short circuit path of a relay A which is in the energized position with the contact VR open. The current path of relay A leads from the positive terminal of a direct current source U, through the relay A and a resistance $R_5$ to the negative terminal of the current source. A contact $A_1$ of the relay A is open in the rest condition of the relay and in the working position closes the current circuit of a relay B from positive through $A_1$ B to negative.

After a magnetic recording carrier has been placed into the dictating machine, the latching arrangement and its contact VR is closed. Thereby, the relay A is deenergized and lapses into the rest position. By the contact $A_1$, the current circuit of the relay B is interrupted. The relay B can however hold for a predetermined time from the charge of a condenser $C_1$, since a discharge current flows from the condenser $C_1$ through a resistance $R_1$ and the relay B back to the condenser $C_1$.

With lapsing of the A-relay a stopping magnet S is deenergized through opening of a contact $A_3$ and thus switches on the recording carrier transport mechanism. The head T thus begins its run from point *a* (see FIG. 1) in the forward running direction *l* and the test interval or interrogation interval *b* commences, in which the carrier is tested for the presence of a recording.

A magnetic recording present in the test interval *b* provides a signal which passes from the head T through a contact $W_1$ of a relay W into an amplifier AF, is amplified there and then passes over a second contact $W_2$ of the relay W to a rectifier arrangement consisting of a resistance $R_6$, a rectifier GR and a condenser $C_5$. The positive half waves of the signal, which are produced by the rectification, and are smoothed by the condenser $C_5$, are fed to a relay V which is thereby brought into the working position. The V-relay consequently operates in the rhythm of the recording on the magnetic recording carrier and remains in the rest condition if there is no recording on the recording carrier. By contacts $B_1$ and $V_1$ and through the resistance $R_1$, the condenser $C_1$, even for only short closure times of contact $V_1$, can be fully charged. Thus, the lapsing of relay B and the release of the dictation machine for fresh dictation can be delayed until the end of an old recording on the recording carrier. Of course, an alarm can be given if this test condition exceeds a predetermined time duration, so that a supervisor can be made aware that an incorrect recording carrier, which already contains a recording, is introduced into the dictation machine.

If however an already erased recording carrier is introduced into the dictation machine, then the V-relay cannot move into its working condition, so that the B-relay lapses as soon as the condenser $C_1$ is discharged. If this is the case, then the contact $B_1$ closes the current circuit of a relay G through the current path:

+, contact $B_1$, contact $D_1$, relay G, − and the G-relay thus moves into the working condition. Simultaneously, the current circuit of a relay D is closed through the current path:

+, contact $B_1$, resistance $R_2$, relay D, −

By parallel connection of a condenser $C_2$ to the relay D, a delayed response is achieved which is so long that a repeat magnet RP has sufficient time to switch back the recording head T through the return path D so that the head moves to the point *e* on the recording carrier track. The repeat magnet RP lies in the current circuit:

+, contact $G_1$, magnet RP, −

After the return switching of the recording head T has been effected, the D-relay responds, whereby the G-relay is deenergized by opening of contact $D_1$, and lapses. The contact $D_2$ of relay D is then in the working position and closes the current circuit of a relay E:

+, condenser $C_3$, relay E, −

The condenser $C_3$ was previously discharged through a resistance $R_3$. By a contact $E_3$ of the E-relay, the current circuit of the W-relay is closed through the current path:

+, contact $E_3$, relay W, −

The contacts $W_1$ and $W_2$ move into the working condition and the amplifier AF is accordingly changed over so that the dictation machine is ready for magnetic recording. The E-relay is in the working position during the test tone interval *f* (see FIG. 1) and during this time a low frequency signal simulating speech is recorded on the magnetic carrier.

The test tone is supplied by a generator TG which in known manner produces a low frequency signal, which passes from the output Q through a contact $E_2$ and the contact $W_1$ to the input of the amplifier AF, is there amplified and passes through the contact $W_2$ to the head T which records the signal on the sound carrier.

During the test tone interval *f*, a condenser $C_4$ is discharged through a contact $E_1$ and a resistance $R_4$ and thus prepares for energization of a relay F, which by means of a contact $F_2$ connects a microphone M for the recording. After the charging of condenser $C_3$ and the reduction of the charging current connected therewith, at the end of the test tone interval the E-relay can no longer hold, and lapses into its rest condition. Consequently, the contact $E_1$ moves into the rest condition and a charging current flows in the current circuit:

+, condenser $C_4$, contact $E_1$, relay F, −

As a result of this, the F-relay passes into the working condition and is held in this condition through contacts $F_1$ and $A_2$. The contact $F_2$ then switches the microphone M onto the amplifier AF and at the end of the test tone interval F at the position G, releases the dictating machine for recording.

Modifications are possible. More particularly the invention can be correspondingly applied to dictation machines of various kinds. In the illustrated example not only the recording, but also the playback of already effected recordings on the magnetic recording carrier, is prevented until the end of the test tone interval. Blockage of playback can be dispensed with if listening to already effected recordings is not to be prevented. If the playback is associated with an amplification control, then this amplification is preferably automatically adjusted during the test interval to a high level or its maximum. If desired, the forward running during the test interval and the test tone interval can take place with an increased speed in order to shorten the preparatory time until release of the dictation machine for a fresh recording. In this case, a larger test extent can be used without undesired loss of time, and, since during such a large test extent it can with certainty be expected that an already existing recording would be detected, a test tone recording can be dispensed with.

We claim:

1. A dictating machine adapted to receive a magnetic recording medium carrier and adapted to receive from said carrier a playback signal over a length of said carrier from a starting location on said carrier including, transducer means, recording means associated with said transducer means, playback means associated with said transducer means, and means for moving said medium in a first direction after said carrier has been loaded in said dictating machine, wherein the improvement comprises:

means coupled to said playback means for limiting said machine to operation with said recording means operatively disengaged, and said playback means operatively engaged while a portion of said length including said starting location is operatively coupled to said transducer means; and means for thereafter automatically repositioning said carrier with a point intermediate said portion of said length in operative engagement with said transducer means when the playback signal from said transducer means during said portion is less than a given amplitude threshold.

2. A dictating machine as defined in claim 1 comprising means for preventing said recording means form becoming engaged when the playback signal from said transducer means during said portion exceeds a given amplitude threshold.

3. A dictating machine as defined in claim 1 wherein said means for automatically repositioning said carrier comprises means for reversing the direction of said recording medium until said transducer means is in operative engagement with said point, and means for subsequently recording in the forward direction an above threshold test tone during a fixed test tone interval.

4. A dictating machine as defined in claim 3 wherein said recording means is caused to be operatively engaged after the termination of said fixed test tone interval.

5. A dictating machine as defined in claim 3 wherein said means for limiting, said means for reversing and said means for recording said test tone may operate at increased speed thereby shortening the delay time until dictation can be made.

6. A dictating machine as defined in claim 1 comprising means for blocking an audible playback signal while said transducer means is operatively engaged with said portion of said medium.

7. A dictating machine as defined in claim 6 wherein said means for blocking includes means for blocking an audible signal after said portion is passed when a playback signal having an amplitude in excess of said threshold amplitude is detected during said portion.